Jan. 26, 1954

R. P. HAVILAND 2,667,575

RADAR RECEIVER DISPLAY SYSTEM

Filed March 29, 1949

Inventor
ROBERT P. HAVILAND

By

Attorney

Patented Jan. 26, 1954

2,667,575

UNITED STATES PATENT OFFICE 2,667,575

RADAR RECEIVER DISPLAY SYSTEM

Robert P. Haviland, Scotia, N. Y.

Application March 29, 1949, Serial No. 84,241

2 Claims. (Cl. 250—27)

(Granted under Title 35, U. S. Code (1952), sec. 266)

The present invention relates to an improvement in radar receiver display systems and more particularly to a radar receiver display system having means for improving the presentations of beacon signals.

At the present time radar systems have two modes of operation, one being "search" operation or the scanning of a particular area to determine the presence, position and other characteristics of any targets in that area, and the other being beacon operation or the reception of signals from known beacons located at known fixed points for the purpose of indicating the position and course of the mobile craft. In these systems the beacon signals, which are usually coded, are received and passed through the same channels as the target echo signals and are often not clearly visible and distinguishable to the observer thereby reducing the value of such beacon signals for accurate and rapid presentation of the craft's position.

It is an object of this invention to provide a radar receiver display system having means for enhancing the presentation of beacon signals.

Another object is to provide a radar display system with means for increasing the vsibility of beacon signals on the display device of the system.

A further object of this invention is the provision of means in a radar display system for increasing the brilliancy of radar beacon signals as presented on the display device of the system.

Still another object is to provide a predetermined distortion in the receiver of a radar system when beacon signals are being received in order to increase the relative length and thereby the visibility of such signals.

A still further object of this invention is the provision of means for controlling at will the presentation of the beacon signals on the display device of the radar receiver.

The exact nature of this invention as well as other objects and advantages thereof will be readily apparent from consideration of the following specification relating to the annexed drawing in which.

Figure 1:
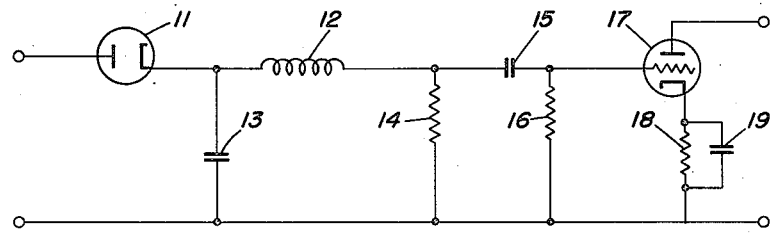
Fig. 1 is a wiring diagram of a conventional radar receiver second detector and limiting amplifier.

Referring now to the drawings, wherein like reference characters designate like or corresponding parts throughout the several views, there is shown in Fig. 1 a portion of a conventional radar receiver comprising a second detector tube 11 having its input connected to the incoming radio frequency signal, and having a load circuit comprising a series inductance 12, a condenser 13 and a resistor 14. The load circuit of tube 11 is resistance-capacitance coupled, by means of input condenser 15 and grid-leak resistor 16, to the input of a limiting amplifier tube 17 having a cathode bias resistor 18 connected thereto, there being a bypass condenser 19 across resistor 18.

Figure 3:
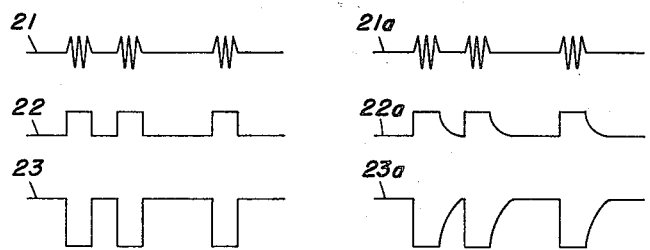
Fig. 3 illustrates the wave forms of a typical beacon signal at various points in the circuits of Figs. 1 and 2.

Under normal operation of the system of Fig. 1 for target searching, the circuit constants are so chosen as to maintain the wave form of incoming echo signals substantially undistorted. Thus, as shown in Fig. 3, an incoming radio frequency signal 21 produces an essentially undistorted square wave pulse 22 at the detector output, which is then limited and amplified by tube 17 to produce the wave 23 for application to the control grid of the display device, not shown.

Figure 2:
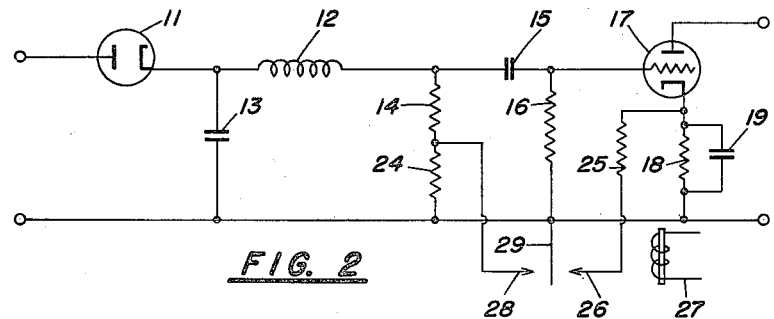
Fig. 2 is a wiring diagram of an improvement of Fig. 1 including one embodiment of the present invention.

Referring now to Fig. 2, wherein is shown an improvement of the circuit of Fig. 1 according to the present invention, a resistor 24 is inserted between one end of resistor 14 and ground, and a resistor 25 is connected between the cathode end of resistor 18 and one fixed contact 26 of relay 27, the other fixed contact 28 of relay 27 being connected to the junction point of resistors 14, 24, while the movable contact 29 is grounded. Under normal search operation of the circuit of Fig. 2, relay 27 remains deenergized so that movable contact 29 is connected to fixed contact 28 and resistor 24 is thereby shorted. Resistor 25, under these conditions, is not in the circuit and the operation is identical with that of the circuit of Fig. 1.

When beacon operation is desired, relay 27 is energized thereby connecting contacts 26 and 29 so that resistor 24 is in series with resistor 14 and resistor 25 is shunted across resistor 18. In this manner the time-constant of the discharge path of the detector circuit is increased so as to provide a distortion of the incoming signal 21a, as shown in Fig. 3, thereby effectively increasing the time duration of the signal 22a at the output of the detector circuit. Similarly, by connecting resistor 25 in parallel with resistor 18, the self-biasing of tube 17 is decreased thereby increasing the gain and limiting level of tube 17 so that the output 23a of tube 17, and the relative brilliance of the beacon signals on the display device, is increased.

The resultant effect of the addition of resistors 24 and 25 is to increase the length and intensity of the beacon signals to thereby increase the visibility and brilliance of said signals. It is clear that any other means, other than relay 27, may be utilized for controlling the insertion into the circuit of resistors 24 and 25, and that said means may be either automatic or manual. Furthermore, it is within the scope of this invention to utilize other components or circuits for introducing the predetermined distortion into the circuit so as to increase the relative length of the beacon signals. It is, therefore, to be understood that, within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. In a radar receiver, a limiting amplifier tube having a plate, a grid and a cathode; a detector tube, an inductance and a first condenser connected in series and coupled to the grid of said limiting amplifier tube; a second condenser one side of which is connected to ground and the other side between the detector tube and the inductance; a first resistor, a second resistor, one end of the first resistor being connected between the inductance and first condenser and the other end being connected to the second resistor, the latter's opposite end being connected to ground; a third resistor one end of which is connected between the first condenser and the grid of the limiting amplifier tube and the other end of which is connected to ground; a fourth resistor, one end of which is connected to the cathode of the limiting amplifier tube and the other end of which is connected to ground; a third condenser connected in parallel with the fourth resistor; a fifth resistor, one end of which is connected to said cathode; and a relay switch having a movable contact connected to ground, and having first and second fixed contacts, said first contact being connected between said first and second resistors, said second contact being connected to the other end of said fifth resistor.

2. In a radar receiver including a triode amplifier having a plate, a grid and a cathode, a first self biasing resistor connected in the cathode circuit of said triode: a diode detector having a charging circuit in its output, and having first and second series connected discharge resistors connected across said charging circuit; means coupling said first and second discharge resistors to said grid; a second self biasing resistor adapted for connection across said first self biasing resistor; and switch means normally short circuiting said first discharge resistor movable to simultaneously open said short circuit and to connect said second biasing resistor across said first biasing resistor.

ROBERT P. HAVILAND.

References Cited in the file of this patent
UNITED STATES PATENTS

| Number | Name | Date |
|---|---|---|
| 2,222,172 | Dimmick | Nov. 19, 1940 |
| 2,240,420 | Schnitzer | Apr. 29, 1941 |
| 2,283,415 | Cox | May 19, 1942 |
| 2,361,437 | Trevor | Oct. 31, 1944 |
| 2,435,195 | Bomberger | Feb. 3, 1948 |
| 2,495,780 | Shepherd et al. | Jan. 31, 1950 |
| 2,519,802 | Wallman | Aug. 22, 1950 |
| 2,549,473 | Jacob | Apr. 17, 1951 |